Nov. 12, 1929.     H. W. DYER     1,735,453
HOUSEHOLD REFRIGERATOR
Filed May 14, 1924

INVENTOR.
ATTORNEY.

Patented Nov. 12, 1929

1,735,453

UNITED STATES PATENT OFFICE

HARRY W. DYER, OF NEW YORK, N. Y.

HOUSEHOLD REFRIGERATOR

Application filed May 14, 1924. Serial No. 713,144.

Figure 1:
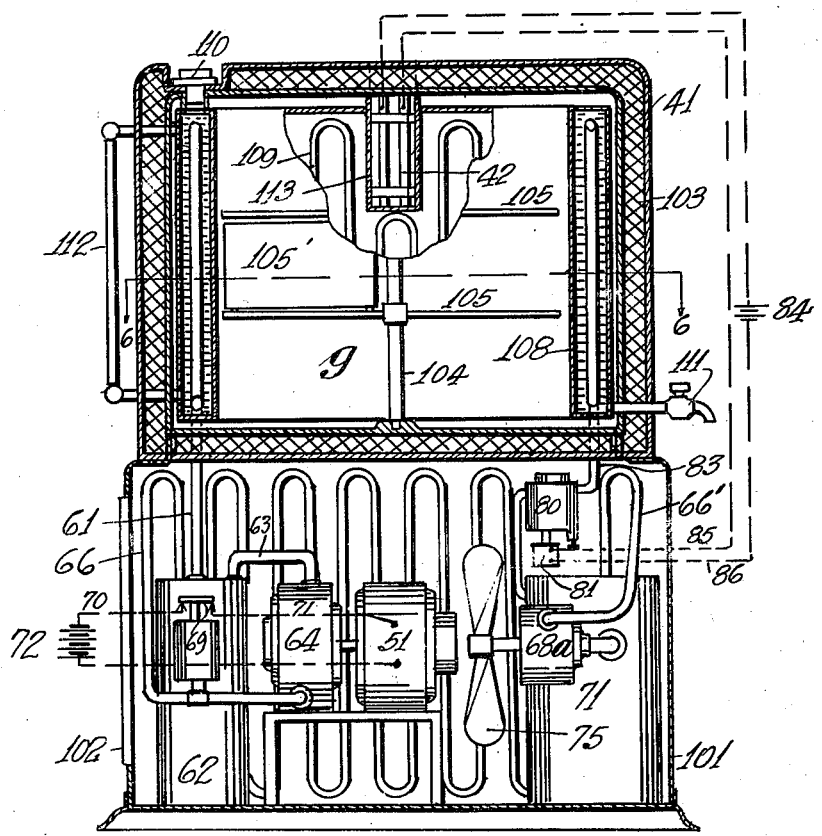
Figure 2:
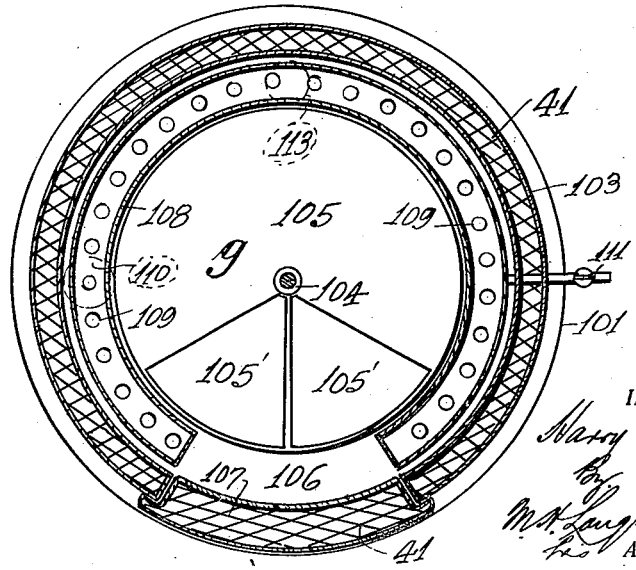

This invention relates to mechanical refrigerating apparatus of the portable or household type and has for an object to improve the construction of apparatus of this kind, to economize space, to make its operation safe and to provide a self contained unit that is readily portable. These and other objects of the invention will be understood from the following specification and the accompanying drawings in which, Fig. 1, is a sectional elevation of a refrigerator constructed according to my invention and Fig. 2 is a transverse section on line 6—6 of Fig. 1.

This apparatus, preferably uses air as the refrigerating medium. The air is compressed by a motor driven pump, then it is cooled in a pressure coil or cooling manifold, the cold air is then expanded into a receiver through a motor or expanding engine driving a cooling fan and from this receiver through a thermostatically controlled valve to the refrigerating coil and from this coil to a second receiver tank where it is again pumped into the cooling manifold and the cycle of operation is repeated in a closed circulating system. The motor driving the pump and the supply to the refrigerating coil are controlled independently of each other. The motor is controlled by the pressure in the cooling manifold and operates automatically to maintain a constant pressure in this manifold. The supply to the refrigerating coil is controlled by a thermostat and is used as the temperature of the cooling chamber is lowered.

The cooling chamber is preferably cylindrical with suitable heat resisting walls and a door opening in the side not exceeding 60° of the circumference. Within the cooling chamber is an annular cooling tank adjacent to and coterminous with the walls of the cooling chamber in which the refrigerating manifold is placed. This tank is filled with water the temperature of which is lowered by the refrigerating medium in the refrigerating coil and through the water a low temperature is maintained in the cooling chamber. The cooling chamber itself is enclosed by the water tank and is thus surrounded by a uniform low temperature. A thermostat inserted in an open ended tube in the water tank automatically controls the supply of the refrigerant to the refrigerating coil.

In the drawings the cooling chamber is indicated by $g$ which is located in the upper part of the device resting upon the base 101 which is provided with slotted openings 102 for air circulation. The base houses the cooling or pressure manifold 66 as shown and an air circulation is maintained through this manifold by fan 75. The motor 51 is directly connected to the pump 64 and is operated from battery 72 by wires 70 and 71 which are controlled at 69 by the stem of a cylinder connected to pipe 66. As the pressure in pipe 66 is raised above a predetermined value the circuit of the motor is broken at 69 to be reestablished when the pressure is below this predetermined value.

Pump 64 by pipe 63 pumps air from receiver tank 62 and from the refrigerating manifold 109 to a sub-normal pressure and delivers it at pressure to the pressure manifold 66. The air is cooled in this manifold by fan 75 and by the atmosphere and is delivered through an expansion engine 68$^a$ to the receiver tank 71 where it is stored to be used as required by the thermostat.

The thermostat 42 is placed in an open ended tube 113 in the top of the water tank 108 and is thus directly influenced by the temperature of the water. By battery 84 and wires 85 and 86 the thermostat controls valve 80 through the magnet 81. Valve 80 connects the receiver tank 71 with pipe 83 which connects to the refrigerating manifold 109 in the water tank 108. The opposite end of this manifold connects by pipe 61 with receiver tank 62 where it connects to the pump 64 by pipe 63 thus completing a closed circuit system. It will be noted that the air in coil 66 is expanded through the fan motor 68ᵃ before entering tank 71 thereby producing useful work in operating the fan for cooling the system.

As the temperature in the cooling tank 108 increases the circuit of magnet 81 is established, this operates valve 80, a new supply of cooled refrigerant is supplied from receiver tank 71 to refrigerating coil 109 which is at a sub-normal or lower pressure than tank 71 until the temperature of the tank 108 is lowered when the thermostat opens the circuit and the operation is repeated as the temperature in the cooling tank again increases. The valve 81 thus controls the supply of refrigerant to the refrigerating coil independently of the control of the motor 51 which is controlled by the pressure in the cooling manifold 66. After the thermostat causes valve 80 to close, the motor continues to build up pressure in the cooling coil 66 which remains to be gradually cooled by the atmosphere until used.

As the refrigerant in receiver 71 is used, a new supply is drawn from the cooling manifold, this lowers the pressure in pipe 66 causing the pressure cylinder to close the motor circuit at 69 thereby starting the motor to compress a new supply. The circuit controlled by the cylinder also controls the operation of the cooling fan 75 through the fan motor 68ᵃ which, mechanically, is independent of the motor 51. The fan is operated as the pressure is increased in the coil 66'.

The top section or cooling chamber is circular in shape as indicated at 103, preferably formed from sheet metal with heat insulated walls as at 41. A door is provided in the side as indicated at 107 and opposite the door opening the tank 108 is omitted to provide the aperture 106.

The cooling tank is annular in shape and placed close to the walls of the housing. The inner walls of the tank form the walls of the cooling chamber and thus an even distribution of the refrigeration effect obtains in the cooling chamber. The cooling coil is placed inside the tank in the form of a vertical manifold 109 as shown. When air is used as the refrigerant no danger can arise if the refrigerant should escape, it is therefore possible to use the water in the cooling tank for domestic purposes. This water may be supplied through the plug 110 and drawn off at 111. A gage 112 shows the height of the water in the tank. Of course where very low temperatures are desired it will be necessary to use a brine or some non-freezing liquid in the tank.

It has been stated that the preferable refrigerant is air and the mechanism is adapted for use with this refrigerant, it is to be understood however that the principles of the invention are not restricted to an air refrigerant but may be applied with any of the well known refrigerating mediums.

The cooling chamber is provided with revolving shelves which may be rotated so as to be accessible from the door opening. These shelves are preferably provided with segmental drawers of such size as to pass through the door opening and to occupy a segment of the shelf. The food to be preserved is placed in these drawers. As shown, the vertical shaft 104 in the centre of the cooling chamber rotatably supports shelves 105—105. These shelves, in turn, support the segmental drawers 105'. As the shelves are rotated, any drawer may be withdrawn through the door opening. The door opening should, preferably, not be greater than 60° of the wall of chamber $g$ so that the air in this chamber does not readily escape when the door is opened. The drawers enable this chamber to be occupied to full capacity and form a barrier to the escape of air when the door is opened.

Having thus described my invention, I claim:

1. In a refrigerating apparatus, the combination of a cooling chamber, a refrigerating coil associated with said chamber, a pressure coil, means for delivering air under pressure to said pressure coil, a receiver tank connected through an expanding motor with said pressure coil and means controlled by temperature changes in said cooling chamber for connecting said receiver tank with said refrigerating coil.

2. In a refrigerator of the class described, in combination; a cylindrical housing, an annular cylindrical tank containing a liquid and enclosing a cooling chamber placed in said housing adjacent the walls of said housing, a central shaft in said chamber, shelves rotatably supported by said shaft, a refrigerating coil comprising straight lengths of pipe placed vertically in said cylindrical tank and connected in series and mechanical refrigerating apparatus for forcing a refrigerant through said coil.

3. In a refrigerator of the class described, the combination, a cooling element, a cooling coil, a motor driven pump and a fan mechanically independent of said motor for cooling said cooling coil, said cooling element and said cooling coil connected in a closed circuit with said pump whereby a refrigerating medium is circulated in said elements and a device responsive to said medium through the operation of said pump and arranged to control said motor and said fan.

4. In a refrigerator of the class described, the combination, a cooling element, a cooling coil, a motor driven pump and a fan mechanically independent of said motor for cooling said cooling coil, said cooling element and said cooling coil connected in a closed circuit with said pump whereby a refrigerating medium is circulated in said elements and a device responsive to the pressure in said closed circuit controlling the circuit of said motor and controlling the operation of said fan.

Signed at New York in the county of New York and State of New York this 25th day of April A. D. 1924.

HARRY W. DYER.